(12) United States Patent
Dunlap et al.

(10) Patent No.: US 6,760,749 B1
(45) Date of Patent: Jul. 6, 2004

(54) INTERACTIVE CONFERENCE CONTENT DISTRIBUTION DEVICE AND METHODS OF USE THEREOF

(75) Inventors: Wayne Dunlap, San Jose, CA (US); Michael Hogan, Austin, TX (US); Kristin Dunn, Los Gatos, CA (US); Oden J. McMillan, Palo Alto, CA (US); Rick VanderKam, Sunnyvale, CA (US); Samantha Kha, San Jose, CA (US); DahRenn Ba, Fremont, CA (US)

(73) Assignee: Polycom, Inc., Milpitas, CA (US)

( * ) Notice: Subject to any disclaimer, the term of this patent is extended or adjusted under 35 U.S.C. 154(b) by 0 days.

(21) Appl. No.: 09/568,642

(22) Filed: May 10, 2000

(51) Int. Cl.[7] .............................. G06F 9/00; H04N 7/14; G09G 5/00
(52) U.S. Cl. ................. 709/204; 348/14.08; 348/14.09; 345/719
(58) Field of Search ....................... 709/204; 348/14.08, 348/14.09; 345/716, 719, 730; 370/260, 270

(56) References Cited

U.S. PATENT DOCUMENTS

| | | | | |
|---|---|---|---|---|
| 5,625,407 A | * | 4/1997 | Biggs et al. | 348/14.11 |
| 5,758,079 A | * | 5/1998 | Ludwig et al. | 709/204 |
| 5,896,128 A | * | 4/1999 | Boyer | 345/716 |
| 5,916,302 A | * | 6/1999 | Dunn et al. | 709/204 |
| 5,978,835 A | * | 11/1999 | Ludwig et al. | 709/204 |
| 5,996,015 A | * | 11/1999 | Day et al. | 709/226 |
| 5,999,966 A | * | 12/1999 | McDougall et al. | 709/204 |
| 6,128,649 A | * | 10/2000 | Smith et al. | 709/217 |
| 6,151,619 A | * | 11/2000 | Riddle | 709/204 |
| 6,343,314 B1 | * | 1/2002 | Ludwig et al. | 709/204 |
| 6,421,706 B1 | * | 7/2002 | McNeill et al. | 709/204 |
| 6,438,111 B1 | * | 8/2002 | Catanzaro et al. | 370/260 |

OTHER PUBLICATIONS

PictureTel StarCast, http://www.picturetel.com/products/starcast.htm.
PictureTel eVideo Application Server, Dec. 1999.

* cited by examiner

Primary Examiner—Krisna Lim
(74) Attorney, Agent, or Firm—Wong, Cabello, Lutsch, Rutherford & Brucculeri, L.L.P.

(57) ABSTRACT

A multimedia distribution device includes an embedded stream encoder and an embedded stream server for encoding and transmitting, through utilization of streaming technology, audio and video content originating from a videoconference site and received through a network interface, to network-connected terminals. In situations in which the videoconference includes the presentation of slides or other content, the device may include a file conversion engine for converting the presentation content received through a data interface into a standard graphic image format, for synchronous distribution with the audio and video content stream. The multimedia content may be viewed in a multiple-window interface, wherein the audio and video content is presented by a streaming media player, and the presentation content is displayed in a separate window. Additionally, the interface may include an interactive text entry interface, through which the viewer may submit comments or questions to the conference presenters. In an operating architecture that includes a separate remote streaming server and a separate network server, a method of distributing content to a large number of viewers includes continuously transmitting the current and successive presentation images to the network server for caching, whereby the viewer web browser can request and locally cache the images prior to arrival of the associated audio and video content.

57 Claims, 7 Drawing Sheets

INTERACTIVE CONFERENCE CONTENT DISTRIBUTION DEVICE AND METHODS OF USE THEREOF

CROSS-REFERENCE TO RELATED APPLICATION

The present application is related to U.S. patent application Ser. No. 09/417,903, filed on Oct. 14, 1999 and entitled "Conferencing System Having An Embedded Web Server; and Methods of Use Thereof" and U.S. patent application Ser. No. 09/452,900, filed Dec. 2, 1999, now U.S. Pat. No. 6,569,637 and entitled "Web-Enabled Presentation Device And Methods Of Use Thereof" which are hereby incorporated by reference.

BACKGROUND

1. Field of the Invention

The present invention relates generally to computers and communications equipment, and more particularly to a device and methods for interactive distribution of multimedia conference content over a computer network.

2. Description of the Prior Art

Videoconferencing systems have become an increasingly popular and valuable business communications tool. These systems facilitate rich and natural communication between persons or groups of persons located remotely from each other, and reduce the need for expensive and time-consuming business travel.

Videoconferences are often enriched through the sharing of slide presentations, to display text and graphics simultaneously with the personal interaction among the conference participants. A typical method for sharing slide presentation content among conference participants involves aiming of the videoconferencing camera at a screen onto which the presentation slides are being projected at a conference site, thereby transmitting the content to the other conference sites. This method is not ideal because directing the camera at the presentation may preclude simultaneously directing the camera at the participants, thus sacrificing the visual contact with the participants.

Traditional videoconferences are generally limited in the number of sites that may actively participate in the conference. The limitation stems from the limitations inherent to the videoconferencing equipment, which restrict the number of endpoint participants, and from the traditional data transmission networks utilized, such as the PSTN (public switched telephone network), a circuit switched network in which the communication path between the parties is dedicated to that communication and thus generally an inefficient utilization of resources. Videotaping the conference for mass distribution is one solution to the limited reach of conferences, but this is not ideal due to the passive nature of viewing a past event and the delay between the occurrence of the conference and the ability of non-participants to view the conference.

With the evolution of the Internet, data compression and data transmission technologies are being developed to facilitate the exchange of information among many users networked throughout the world. Some technologies allow a user to play and view multimedia content from their desktop computer, or other machine, running a standard player application.

What is needed in the videoconferencing art is a merger of high quality videoconferencing technology with efficient, state-of-the-art data compression and transmission technology, whereby the personal interaction occurring among the participants during a conference, and the associated slide presentations being viewed at the conference, can be distributed to a large audience in real time. An additional need exists for the ability of remote viewers to communicate with the conference participants during the conference.

SUMMARY

An embodiment of the invention comprises a distribution device for distributing, or webcasting, audio/video content while simultaneously distributing synchronous presentation content (typically consisting of slides and documents) to remote terminals over a computer network via streaming technology. The multimedia content may originate from a live videoconference, and is transmitted to the distribution device through connections with a videoconference device.

The distribution device is preferably provided with a network interface for connecting the device to the computer network, audio/video and presentation data interfaces for receiving conference content, a file conversion engine for converting presentation content into a standard image format for distribution, and a stream encoder for encoding the content into streaming format for distribution. The distribution device is further equipped with a stream server for transmitting the encoded audio/video content and a web server for transmitting web pages and converted presentation content to terminals located at nodes of the network. The distribution device may additionally generate an archive file consisting of the encoded stream data, residing at local storage media, to enable later on-demand distribution to requestors at remote terminals over the computer network.

According to a typical mode of operation, a viewer at a remote terminal accesses a conference by directing a conventional web browser to an URL (Uniform Resource Locator) associated with the distribution device. After completion of validation data interchanges between the viewer and the distribution device, the viewer is able to view the personal interchange, i.e. the conversation and associated behavior, occurring between the participants at the conference presenter site, as well as view the presentation content being presented at the conference site. In one embodiment, the multimedia content is viewed in a multiple-window user interface through the viewer web browser, with the audio/video content presented by a streaming media player, and the presentation content displayed in a separate window. Additionally, the user interface includes an interactive text entry interface, which provides to the viewer the capability to transmit comments or questions to the conference participants at the conference site. The participants can review and reply to the comments or questions in real time.

In another embodiment, the distribution device can be configured to allow certain viewers at the remote terminals to contribute presentation content to the conference. A presenter toolbar having presentation controls is displayed at the remote terminal, and the user may effect predetermined presentation-related operations (e.g., selecting a presentation file or advancing slides within a selected file) by engaging the appropriate controls on the toolbar. This viewer-contributed presentation content is uploaded to the distribution device, through which it is encoded and streamed to remote viewers along with the audio/video content stream originating from the conference site.

In yet another embodiment, the distribution device is coupled to a separate remote streaming server, to provide the capability to distribute content at higher bandwidths and to more viewers than is available with the stream server internal to the device. In addition, the distribution device may be coupled to a separate network server, to provide higher bandwidth distribution to more viewers than is available with the stream server internal to the device, and to provide the capability to host plural conference streams generated by a corresponding plurality of distribution devices. According to this architecture, the distribution device repetitively transmits the current and the successive presentation data image files to the network server for caching, whereby the network server can notify a viewer through the viewer web browser that presentation content is available. Upon encountering a streamed presentation event, the viewer web browser can immediately receive and locally cache the presentation content from the network server prior to arrival of the associated audio/video content, thus minimizing latency in the display of the presentation content in coordination with the audio/video content.

DETAILED DESCRIPTION OF PREFERRED EMBODIMENTS

Figure 1:
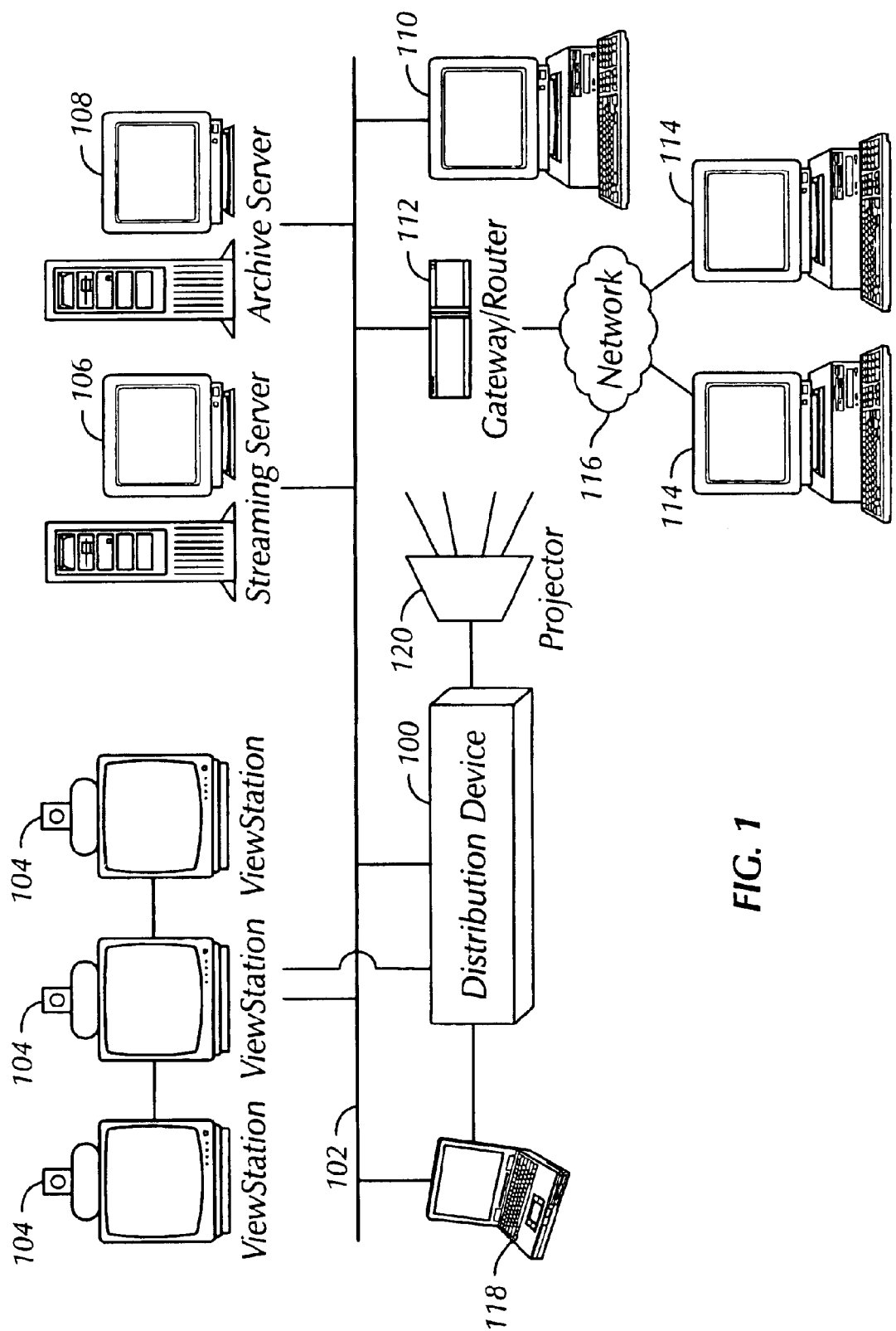
FIG. 1 depicts an exemplary operating architecture of an interactive conference content distribution device, in accordance with an embodiment of the invention.

FIG. 1 depicts an exemplary operating architecture of an embodiment of the invention. A distribution device 100 is connected to a conventional local area network (LAN) 102 to enable communication with other devices. The devices may include, for example, a videoconferencing device 104 (such as the ViewStation™ videoconferencing device available from Polycom, Inc., of Milpitas, Calif.), an optional streaming server 106, an optional archive server 108, and terminals 110 located at nodes of LAN 102. LAN 102 may comprise, for example, an Ethernet network. As is known in the network art, each computer or device connected to LAN 102 is assigned a unique IP address. Distribution device 100 is also preferably assigned an alphanumeric DNS name uniquely identifying the distribution device. For example, distribution device 100 may be given the DNS name "webcast.mycompany.com". Name/address resolution is implemented by a domain name server (not shown) located on LAN 102.

A router or gateway 112 located at a node of LAN 102 allows distribution device 100 and other LAN-connected devices to communicate with additional remote terminals 114 connected to a network 116, such as the Internet. Remote terminals 114 will typically comprise personal computers (PCs), but may alternatively comprise any device capable of running a Java™-enabled web browser, such as Netscape Navigator® or Internet Explorer.

Distribution device 100 is generally configured to distribute multimedia conference content to local terminals 110 over LAN 102 and to remote terminals 114 over network 116. In one mode of operation, a videoconference may be effected through the use of multi-point videoconferencing devices 104. In the architecture depicted in FIG. 1, the videoconferencing devices 104 may intercommunicate through use of a number of standard communication protocols, for example, H.320 for ISDN-based (Integrated Services Digital Network) videoconferencing or H.323 for packet-based videoconferencing. The multimedia conference content is transmitted from the local videoconferencing device 104 to the distribution device 100 through a direct connection. As depicted in FIG. 1, the videoconferencing device 104 and the distribution device 100 are also both coupled to the LAN 102 for communication necessary to initiate streaming sessions, and for displaying the distribution device 100 interface on the display screen associated with the videoconferencing device 104.

The multimedia conference content will typically consist of video and audio streams representative of the images and speech of the conference participants utilizing the videoconferencing devices 104, as well as presentation content such as slides, documents and spreadsheets having text, graphics and/or numerical data (collectively referred to as presentation content) stored on the distribution device 100. The presentation content may include, for example, Microsoft PowerPoint, Word, and Excel files. An optional application device 118, such as a laptop computer, may also be coupled directly to the distribution device 100 and/or through the LAN 102 for the transmission of presentation content from the application device 118 to the distribution device 100. Through encoding, which occurs within the distribution device 100 and is discussed in more detail below, the presentation content is effectively embedded within, and therefore synchronized with, the audio and video streams for distribution to the viewers. Projector 120 may be coupled to the distribution device 100 for projecting the presentation content onto a screen for local viewing. When using the distribution device 100 with videoconferencing equipment other than ViewStation, the display screen of device 118 or projector 120 may be used for viewing the distribution device 100 interface.

The distribution of multimedia content to the viewers at terminals 110 and remote terminals 114 occurs effectively concurrently with the videoconference, albeit with a delay of approximately 10 to 45 seconds, depending on the viewers' individual network connections and streaming media player settings. Additionally, the multimedia content can be stored on the distribution device 100, or on an optional archive server 108, for future access and on-demand streaming distribution to remote viewers.

The total number of terminals 110 and 114 which may simultaneously view the content distributed by distribution device 100 (and hence the maximum number of terminals which may participate in a streaming session) depends on the distribution device 100 configuration. In one commercial embodiment, the distribution device 100 is capable of providing streamed content to up to forty (40) terminals. The total number of remote, terminals 114 which may simultaneously use the service of distribution device 100 through the network 116 will further depend on limitations of network bandwidth, network congestion, and processor performance. To accommodate a greater number of viewers and/or to accommodate higher and multiple bandwidth streams, an alternative operating architecture couples distribution device 100 to a remote streaming server 106 within the LAN 102 infrastructure. The streaming server 106 functions as the streaming server for distribution device 100 and may distribute content to a significantly larger number of local terminals 110 and remote terminals 114.

Figure 2:
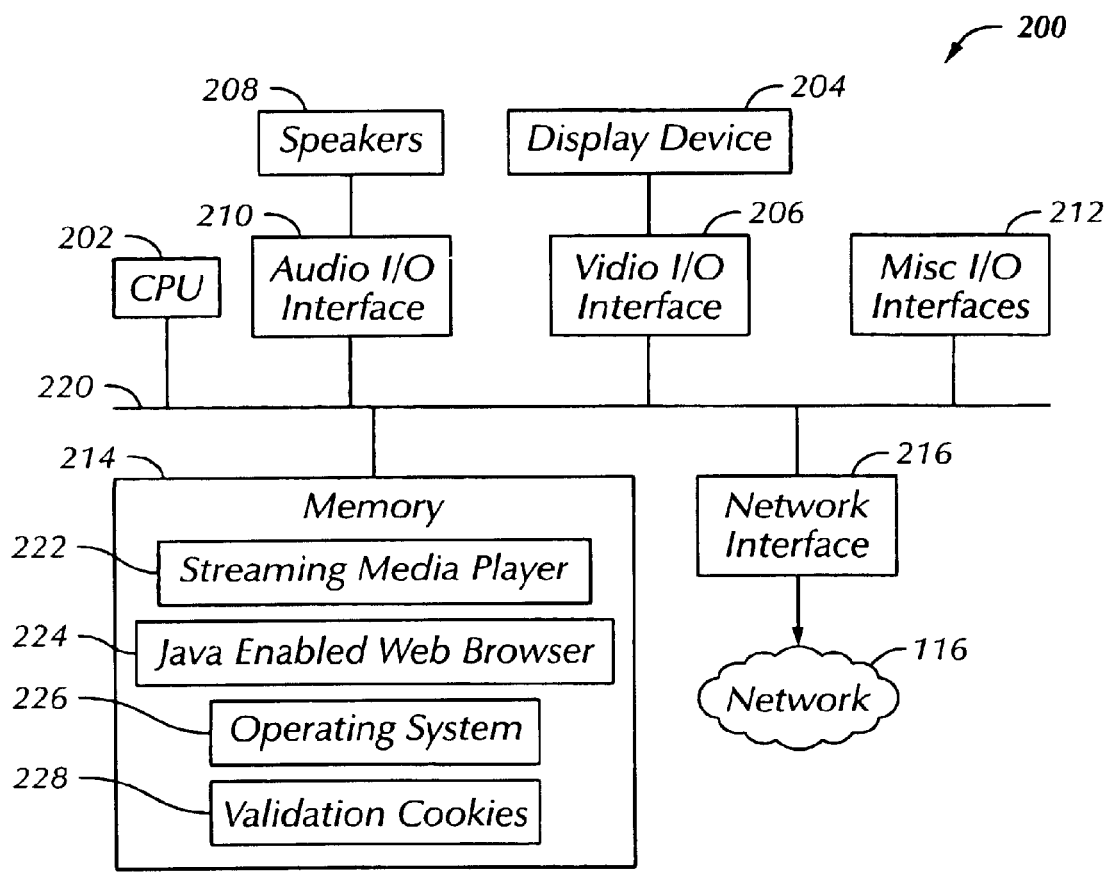
FIG. 2 depicts an exemplary computer device used for viewing streamed multimedia content distributed by the distribution device and methods embodied in the present invention.

FIG. 2 depicts the architecture of a computer device 200, exemplifying the architecture of terminals 110 and 114, that is used for viewing streamed multimedia content distributed by the device and methods embodied in the present invention, and for interacting with conference participants at the conference site. Computer device 200 includes a central processing unit (CPU) 202, such as an Intel Pentium microprocessor, for executing computer program instructions. A display device 204, which may comprise a conventional CRT or LCD monitor, is coupled to a video input/output interface 206 and is configured to display images and text to a user. The video input/output interface 206 may comprise any one of a number of commercially available video display cards, or may comprise circuitry incorporated into a computer motherboard or CPU 202. Audio speakers 208 for amplifying and presenting transmitted signals representative of sound to a user, are coupled to an audio input/output interface 210 (e.g., sound card) for audio signal processing. Miscellaneous input/output devices 212, which may variously comprise printers, keyboards, mice, trackballs, and the like, are operative to receive information from or convey information to a user or another device.

A memory 214, which may include one or a combination of random access memory (RAM), read-only memory (ROM), or non-volatile storage devices such as magnetic hard disks, CD-ROMs, and magneto-optical drives, stores program instructions, files, and other data. Finally, a network interface 216, such as a modem or Ethernet card, is provided to enable communication with one or more remote devices over a network 116 or over the LAN 102 (FIG. 1). The various components of the computer device 200 are coupled in communication by at least one bus 220.

As depicted in FIG. 2, the memory 214 stores a streaming media player 222, such as RealPlayer® from RealNetworks® or Windows Media™ Player from Microsoft®, to play and view the streamed audio/video content. The memory 214 also stores a Java-enabled web browser 224, such as Netscape Navigator® or Microsoft Internet Explorer, for initiating and maintaining communication with the distribution device 100 and for viewing the presentation content images. In particular, the web browser 224 is an application program that uses the Hypertext Transfer Protocol (HTTP) to make requests of web servers throughout the Internet on behalf of the browser user, is capable of supporting functions based on the JavaScript language, and is capable of displaying images in the standard JPEG format. An operating system 226 is stored in the memory 214 for allocating memory, managing communications between computer device 200 components, and performing other low-level operations. Finally, the memory 214 may store validation cookies 228, which typically include information stored for future use by a server on a client device, such as computer device 200.

Figure 3:
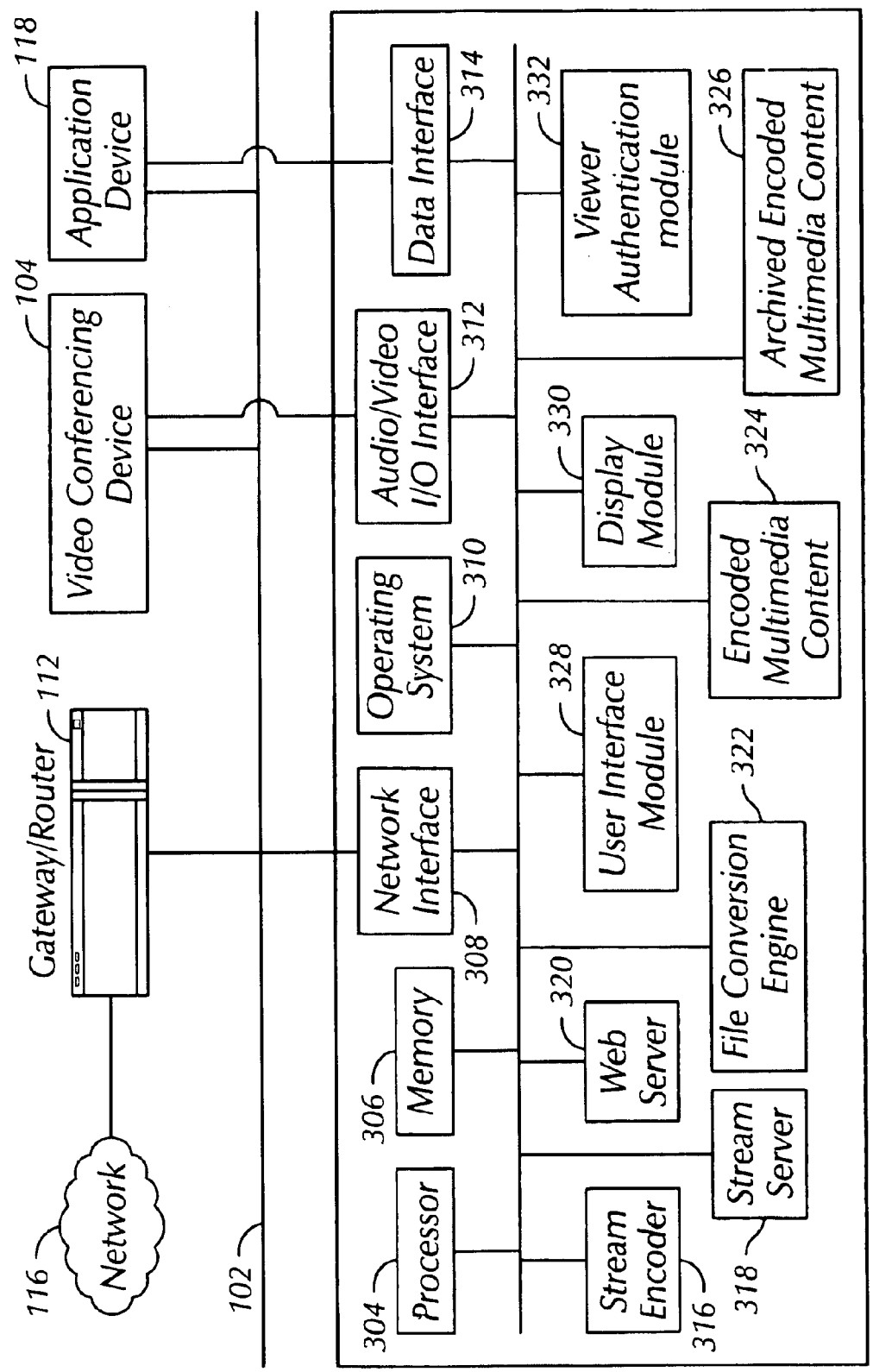
FIG. 3 depicts components of an interactive conference content distribution device, in accordance with an embodiment of the invention.

FIG. 3 depicts components of distribution device 100 interconnected for communication by at least one bus 302.

Components of distribution device 100 include a processor 304, memory 306, a network interface 308, and an operating system 310. Processor 304 interprets and executes instructions loaded from memory 306. Network interface 308 enables connection of distribution device 100 to LAN 102, and may comprise a conventional Ethernet card for mediation between distribution device 100 and the physical connection to LAN 102 in accordance with predetermined protocols. Operating system 310 is operative for allocating memory, managing communications between distribution device 100 components, and performing other low-level operations.

Distribution device 100 further comprises an audio/video interface 312 and a data interface 314 for connecting distribution device 100 to various peripheral devices. The interfaces 312 and 314 may individually comprise any interface, such as a conventional serial or parallel port, USB (Universal Serial Bus) interface, IEEE 1394 High Performance Serial Bus interface, etc., suitable for connecting distribution device 100 to the associated peripheral. The interfaces generally interconnect the bus 302 and a peripheral, such as videoconferencing device 104 (FIG. 1) or application device 118 (FIG. 1), respectively. Alternatively, an internal device (not shown) for reading portable magnetic media, such as a floppy or compact disk drive, may be connected to the bus 302 to provide data to the distribution device 100.

Through utilization of streaming technology, multimedia content is transmitted in a continuous stream in compressed form over the Internet, buffered at the viewer's computer, and displayed to the viewer effectively simultaneous with its reception. A viewer can immediately view the media without having to download entire media files, which are usually large, before viewing. Creating and distributing streaming content requires, and therefore the distribution device 100 comprises, a stream encoder 316 for encoding the multimedia content into a stream, and a stream server 318 for serving the encoded stream to the conference viewers. Stream encoding entails, among other activities, converting the audio/video content into a compressed digital signal, typically by reducing or eliminating redundancies within the content file, through the execution of a codec. Some codecs implement standard compression algorithms, such as MPEG-4, while other approaches implement proprietary compression algorithms.

In addition, distribution device 100 comprises a web server 320 for serving presentation content and web pages, including various user interfaces. The presentation content is synchronously integrated into the encoded stream, and presented to a stream viewer via push technology. Push technology involves the delivery of information in a manner that appears to be initiated by a server rather than by a client, i.e., a viewer. The presentation content is not required to reside on the distribution device 100, but may reside on a separate server such as archive server 108, and may be served by a separate server such as streaming server 106.

Conference participants who are present at the conference endpoints may send presentation content to the distribution device 100. In addition, presentation content may be sent to the distribution device 100 by local or remote viewers through terminals 110 and 114 (FIG. 1), respectively, if the distribution device 100 has been configured for remote presenting.

When uploaded to the distribution device 100, the presentation content files are directed to a file conversion engine 322, which is operative to convert the presentation files into image files encoded in a standard graphical image format, such as JPEG (Joint Photographic Experts Group) or GIF (graphic interchange format). These file types are supported by the HTTP (hypertext transfer protocol), so that they may be viewed through a web browser 224 (FIG. 2) running on a terminal 110 or remote terminal 114 (FIG. 1), without the need for special plug-in applications.

Each image file is stored at a unique location and thus has a unique address, on either the distribution device 100 or a remote server (not shown). The address of the file is indicated through its URL (Uniform Resource Locator), which contains the name of the protocol required to access the resource, a domain name that identifies a specific computer on the Internet, and a hierarchical description of a file location on the computer. After encoding by the stream encoder 316, image files are accessible through their reference link (URL) embedded in the stream. The image files can then be displayed on the display device at the conference endpoints (as discussed in reference to FIG. 1), and simultaneously served by the web server 320 to the viewer web browser 224 (FIG. 2) on the viewer terminal 110 or 114 (FIG. 1) of validated users in a manner synchronous with the related audio and video streams presented by the streaming media player 222 (FIG. 2). In addition, the image files are transmitted to the web server 320 and then cached to the web browser 224 during the stream buffer time, prior to the time at which the corresponding audio/video streams arrive at the browser. This enables minimization of any latency between presentation of the audio/video streams and the presentation images, and enhances the synchronous display thereof. This capability of the distribution system described herein requires no pre-production effort to synchronize the presentation images with the audio/video streams, and is therefore a valuable tool for augmenting traditional videoconferencing as opposed to simply recording and transmitting an event.

The stream server 318 is a program located in the distribution device 100, for serving the encoded stream to the streaming media player 222 (FIG. 2) at local terminals 110 and remote terminals 114 (FIG. 1). As discussed above, a streaming server 106 (FIG. 1) may be provided within the network infrastructure to accommodate higher and multiple bandwidth streams and larger viewing audiences. The streaming server 106 may be located on LAN 102 (FIG. 1) or remotely, within the network 116 (FIG. 1). An embodiment that utilizes a remote network server is discussed in detail below in reference to FIGS. 6 and 7.

During a conference, the distribution device 100 further comprises encoded "live" multimedia content 324 that has been delivered through an appropriate interface to the distribution device 100 by any of the previously described devices, such as videoconferencing device 104, application device 118, terminals 110 (not shown) and remote terminals 114 (not shown). Archived encoded multimedia content 326 from paste video conferences is also stored on distribution device 100 for a period of time, for on-demand availability to viewers for future download and viewing.

Completing the discussion of the components of distribution device 100 depicted in FIG. 3, a user interface module 328 enables the user to set up streamed conferences, to start streaming the multimedia content 324, to select presentation content files that are resident on the distribution device 100 for integration with the stream, to display and administer archived content 326, to administer and edit distribution device 100 system configuration parameters, to administer passwords, and to perform other functions in connection with the operation of the distribution device 100.

A display module 330 is operative for coordinating the display of the audio, video, and presentation data and the viewer comments at the conference site, as well as displaying information provided by the user interface module 328. For example, information about the current meeting may be displayed, such as the number of presentation slides and the number of viewers. The data and information may be displayed by one, or by a combination, of the following devices: the videoconferencing device 104 (FIG. 1) display screen, the application device 118 (FIG. 1), or the projector 120 (FIG. 1).

Finally, a viewer authentication module 330 is operative to maintain a list of viewers authorized to view and/or present presentation content, and utilizes validation cookies 228 (FIG. 2) to perform an identity and authentication verification when viewers at terminals 110 or remote terminals 114 (FIG. 1) attempt to join a streaming session and/or transmit a question or comment to the conference participants.

The validation cookies 228 (FIG. 2) allow the conference presenter to view an identity list of the current conference viewers at the local terminals 110 and the remote terminals 114 (FIG. 1). Cookies 228 contain viewer and conference identification information and are sent to the viewer terminal 110 or remote terminal 114, through the browser 224 (FIG. 2), upon the initiation of a viewing session by a viewer. Cookies 228 are stored within the viewer terminal memory 214 (FIG. 2) and are at times transmitted back to the distribution device 100, whereby resultant identification information is displayed on the appropriate display screen. The cookies 228 also facilitate a "chat-back" feature of the distribution device 100, which is discussed in detail in reference to FIG. 5.

Figure 4:
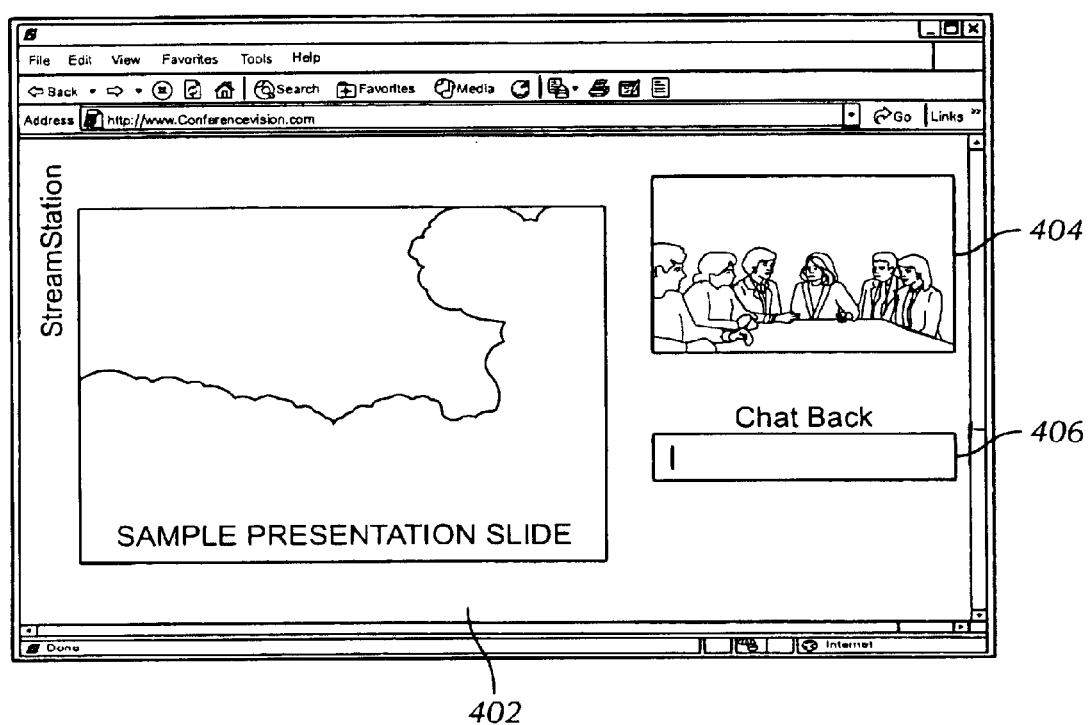
FIG. 4 depicts a typical user interface screen, in accordance with an embodiment of the invention.

FIG. 4 presents a typical user interface screen. In one embodiment of the invention the web server 320 (FIG. 3) of distribution device 100 causes the viewer display device 204 (FIG. 2) to be configured as shown in FIG. 4, such that the presentation content is displayed in a portion of the user interface by the web browser 224 (FIG. 2), or a window 402, while the streaming media player 222 (FIG. 2) concurrently displays the streamed audio/video content in another portion of the user interface, window 404. As a result of the synchronization of the presentation content with the audio/video content in the multimedia content stream, the presentation content being displayed on the display screen is automatically updated at the direction of the conference presenter, and in coordination with the discussion between the conference participants. A text entry interface 406 is displayed concurrently with window 402 and window 404, and is operative to receive the entry of text by the Viewer through a keyboard 212 (FIG. 2), or other input device. This display configuration enables the viewer to watch the discussion between the participants present at the conference site, while concurrently viewing the presentation content that is being displayed and discussed at the conference site.

Figure 5:
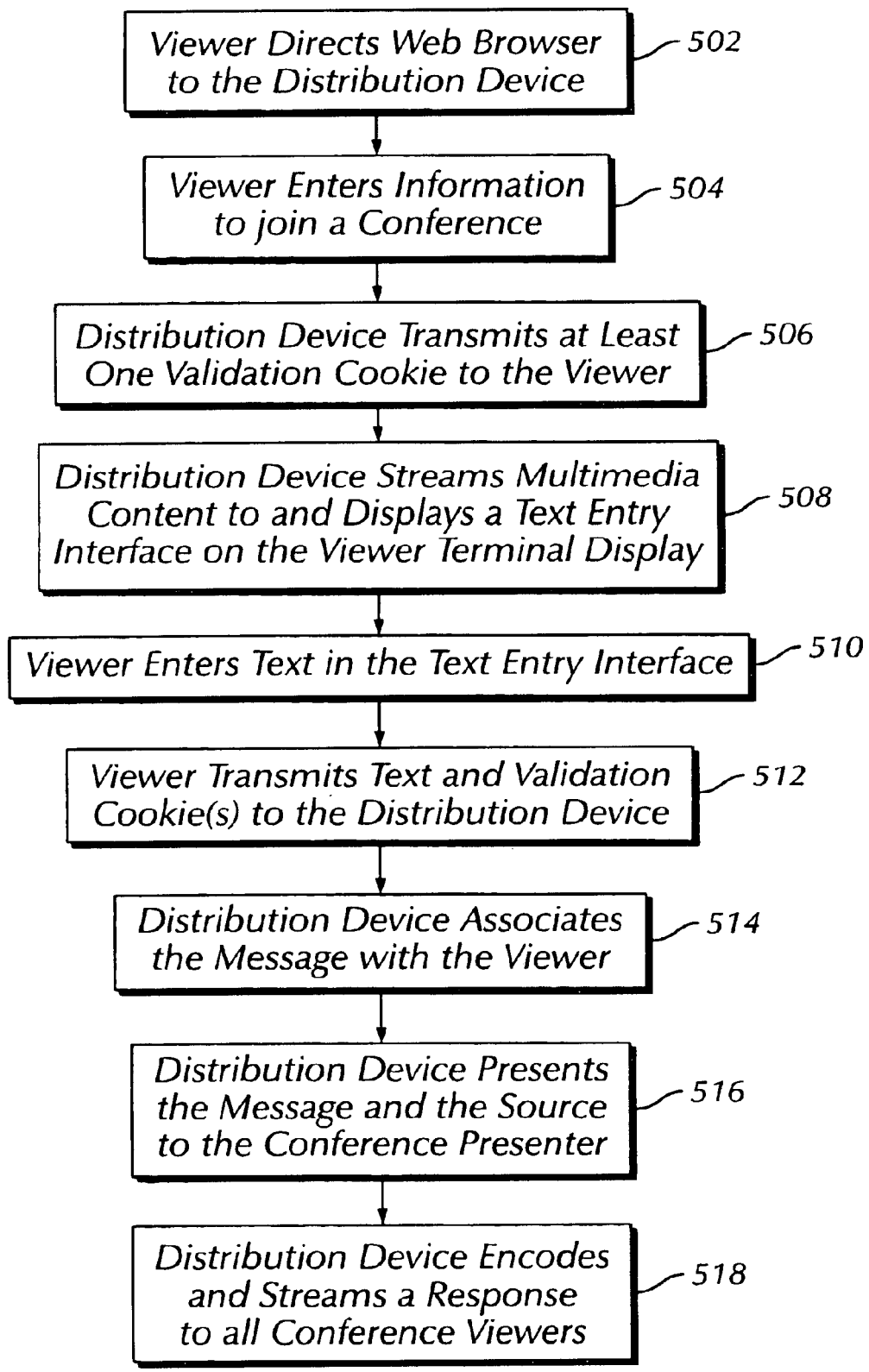
FIG. 5 is a flowchart depicting a method for providing viewers capability to interact with the conference presenters, in accordance with an embodiment of the invention.

FIG. 5 is a flow chart depicting a method for providing viewers capability to interact with the conference participants, referred to as the "chat-back" feature in commercial embodiments. In step 502, from a local terminal 110 or remote terminal 114 (FIG. 1), a viewer directs the web browser 224 (FIG. 2) to the IP address or domain name of the distribution device. Through a distribution device home page presented by the user interface module 326 (FIG. 3) of distribution device 100 (FIG. 3), the viewer may then join a conference by presenting identity and password information, step 504 In response, the distribution device transmits at least one validation cookie 228 (FIG. 2) containing viewer identification information to the memory 214 (FIG. 2) of the viewer terminal 110 or 114 (FIG. 1), step 506.

The distribution device 100 causes the web browser 224 (FIG. 2) to launch the streaming media player 222 (FIG. 2) plug-in applications that the viewer may play and view the streamed multimedia content. At step 508, the distribution device streams encoded multimedia content 324 (FIG. 3) and displays a text entry interface 406 (FIG. 4) to the viewer terminal 110 or 114 (FIG. 1). The encoded multimedia content 324 is decoded by the streaming media player 222 (FIG. 2) at the viewer terminal, and thereby displayed to the viewer.

In one embodiment, in which the conference presenter employs a plurality of display devices, the web server 320 (FIG. 3) of distribution device 100 (FIG. 3) causes one of the presenter display devices (not shown) to display the presentation content, while the other display device concurrently displays the streamed audio/video content. Regardless of presenter system configuration, presenters and viewers can utilize the viewer interaction feature.

Continuing with the method of FIG. 5, at step 510, the viewer can enter text in the text entry interface 406 (FIG. 4) and, at step 512, transmit the text to the distribution device 100, for viewing by the conference presenter. This capability offers local and remote viewers an opportunity to interject dialogue into the ongoing conference, wherein the presenter has the capability of viewing the text entered by the viewer on the local display device. Concurrent with the submission of the text entry, the distribution device requests the re-transmission of the validation cookie(s) 228 (FIG. 2) from the viewer terminal memory 214 (FIG. 2) back to the distribution device 100 (FIG. 3), as part of step 512. Through the information contained in the validation cookie(s) 228, the system identifies the source of the text message and associates the source with the text, step 514. At step 516, the text, along with source information, is presented to the conference presenter on the user interface, through user interface module 328 (FIG. 3).

The viewer interaction feature may be utilized by more than one viewer at a time, thus the conference presenter may simultaneously be presented with a plurality of text messages. The user interface is operative to allow the presenter to review the plurality of messages by scrolling therethrough. The presenters are able to respond to any of the messages with a verbal response or with an appropriate presentation document, which is encoded and streamed to all conference viewers via the real-time multimedia stream.

Figure 6:
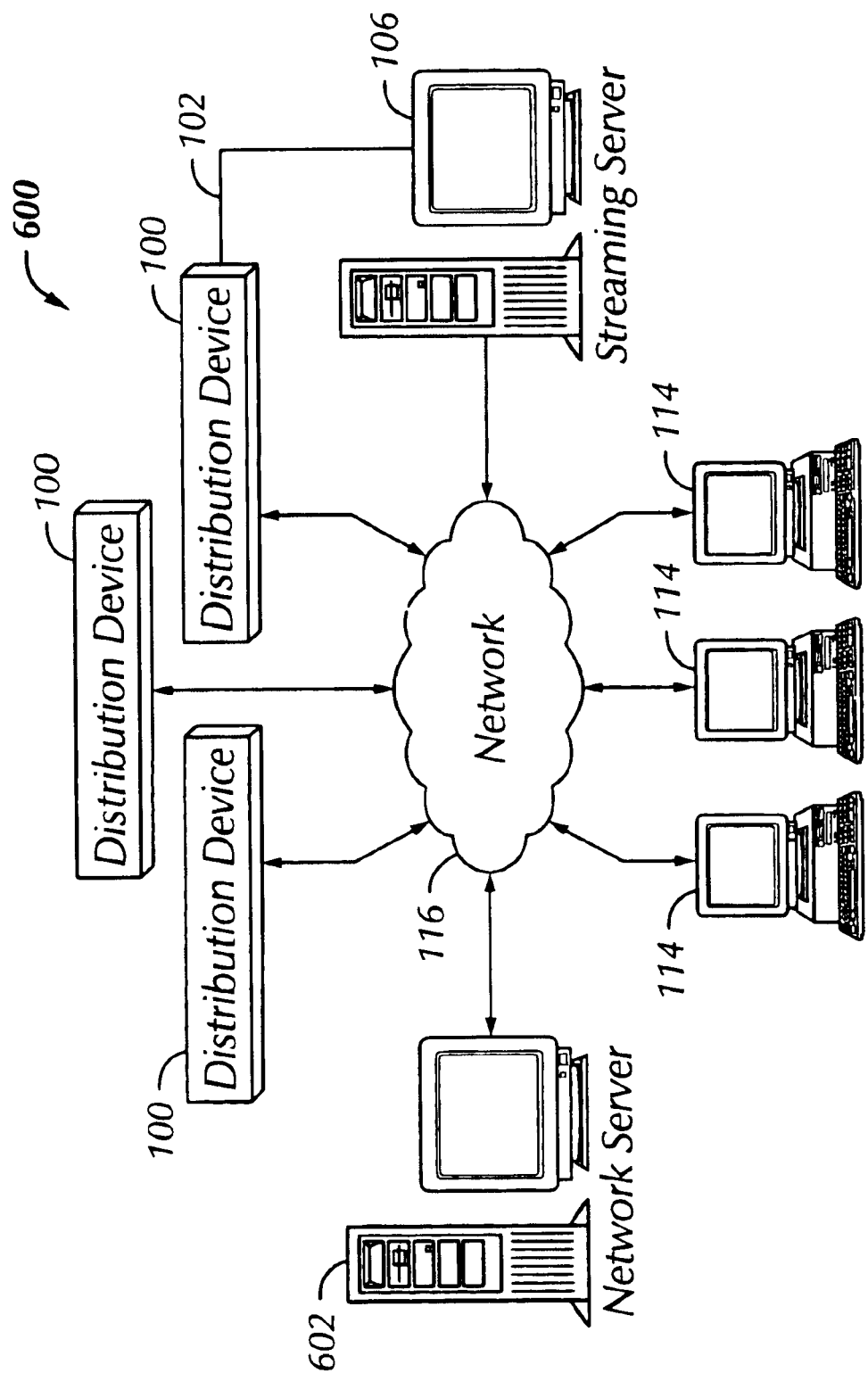
FIG. 6 depicts an alternative operating architecture of an interactive conference content distribution device, which provides multimedia content distribution to a large number of viewers, in accordance with one embodiment of the invention.

FIG. 6 depicts an alternative operating architecture 600, which provides "scaled" multimedia content distribution to a large volume of viewers. As discussed in reference to FIG. 3, the distribution device 100 comprises an internal stream server 318 for serving encoded content to viewers. As was discussed in relation to FIG. 1, the distribution device 100 has the capability to serve a maximum of 40 terminals. The architecture depicted in FIG. 6 employs a remote streaming server 106 to transmit streamed multimedia at multiple and higher bandwidth streams and/or to a larger volume of viewers than can be performed by the distribution device 100 alone.

The operating architecture of FIG. 6 includes a conventional network server 602, which utilizes web server software. The server 602 is capable of coordinating and operating with more than one distribution device 100, and, through coordination with the streaming server 106, is capable of serving a multitude of viewer terminals 114. Additionally, the network server 602 communicates with any or all of the distribution devices 100 and with the terminals 114 through the network 116, as necessary to host a multitude of streamed videoconference sessions.

As previously discussed in reference to FIG. 3, a stream encoder, a stream server, and a web server are operative to provide multimedia streams, including audio, video, and presentation content, to remote viewers. The components depicted in the operating architecture of FIG. 6 are configurable in more than one manner. Functioning as a webcast host, a single network server 602 may include the necessary stream and web server functionality to serve the entire conference content, in which case a separate streaming server 106 is not necessary. In such a server configuration, each distribution device 100 receives conference content from a connected videoconferencing device 104, and subsequently encodes it into a stream format. The stream from each distribution device 100 is transmitted to the server 602, where it is assigned a unique network address so that it can be accessed by, and consequently served to, viewers through the network 116.

Alternatively, the network server 602 may include only the web server functionality, in which case each distribution device 100 receives and encodes conference content. The audio and video streams are transmitted to the streaming server 106 and the converted presentation images are transmitted to the network server 602, or to another web server (not shown). The network server, 602 assigns a unique network address to the conference stream for access to viewers. Upon an access request from a viewer, the network server 602 interfaces with the viewer and serves the converted presentation images, while the access request is routed by the network server 602 to the streaming server 106 to serve the audio and video streams to the viewer terminals 114. It can be recognized by one skilled in the art that a number of different server architectures may be utilized in conjunction with the distribution device 100, to perform the stream serving functions to a large number of viewers, and the invention is not limited to the architectures discussed herein.

In each case, the network server 602 is capable of communicating to the distribution device 100 as to when a web browser 224 (FIG. 2), and thus a viewer, joins and exits a web conference. On the viewer end, the network server 602 is further capable of presenting to the viewer through the web browser 224, a list of various web conferences that are being hosted by the network server 602, and thus which are available for viewing.

Figure 7:
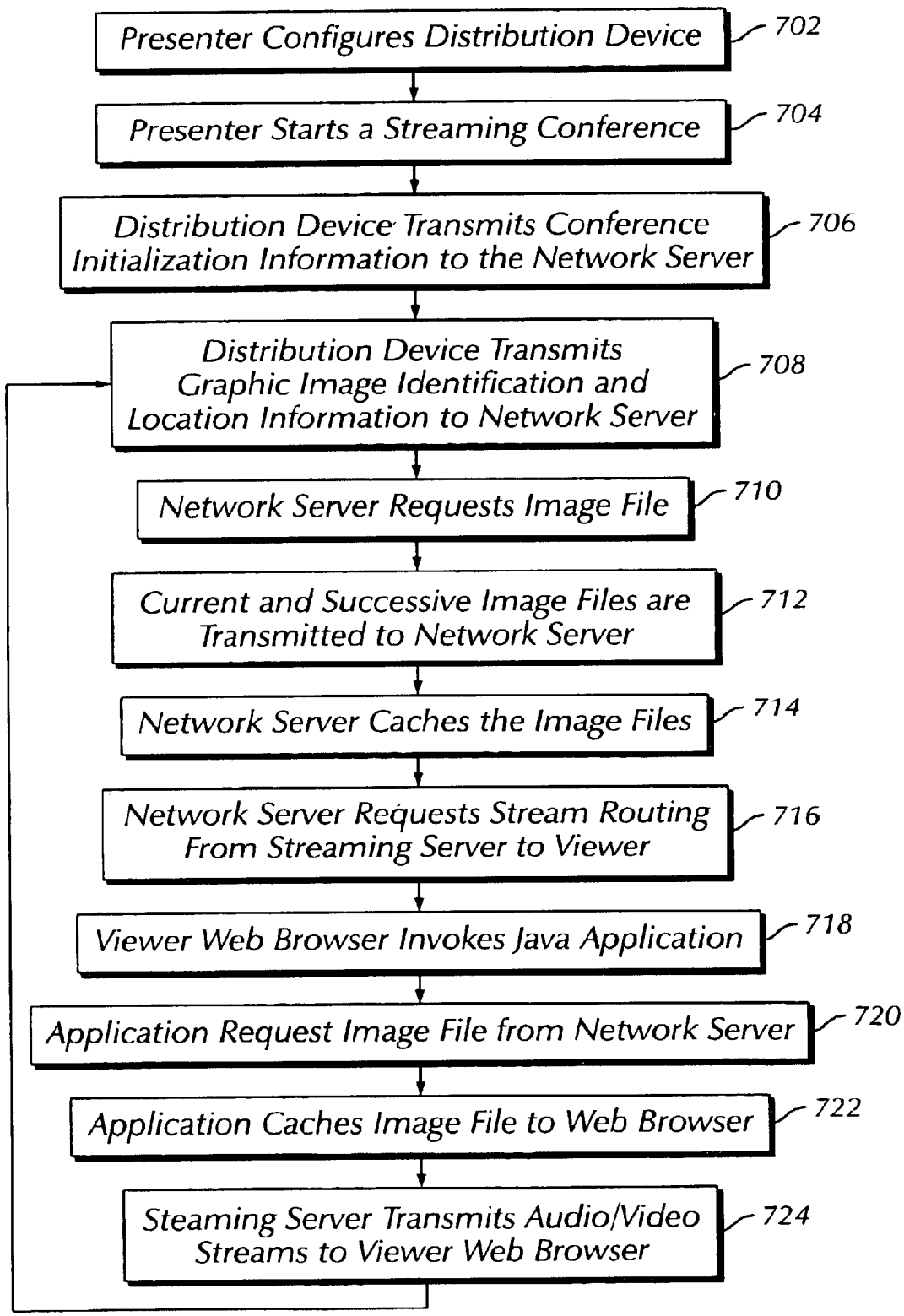
FIG. 7 is a flowchart depicting a method for providing multimedia content to viewers through use of a network server, as generally depicted in the alternative operating architecture of FIG. 6.

FIG. 7 is a flowchart depicting the process of providing streaming multimedia content to viewers at remote terminals 114 through use of a network server 602, as generally depicted in the operating architecture 600 (FIG. 6).

In order to use the network server 602 (FIG. 6) to provide streaming content, the conference presenter configures the meeting administration and network connection parameters of the distribution device 100 (FIG. 6), via the user interface, to utilize a remote streaming server 106 (FIG. 1) and to connect to the network server 602, step 702. As discussed above in reference to FIG. 6, the presenter may alternatively utilize the network server 602 for the streaming function, if it is stream-capable. At step 704, the presenter performs a series of operations with the distribution device 100 to initiate a streaming conference, at which point the distribution device 100 connects to the network server 602 through the network 116 (FIG. 6). After connecting to the network server 602, at step 706 the distribution device 100 communicates to the network server 602 the following information: (a) that a streaming conference is beginning; (b) the meeting capabilities, e.g., streaming and interactive "chat-back" enabled; (c) the streaming protocol, e.g., RealPlayer or Windows Media; and (d) the network address of the remote streaming server 106.

As the conference progresses, the distribution device 100 (FIG. 6) indicates to the network server 602 (FIG. 6) that presentation content is available, along with the image file names of the current (i.e. the slide currently being presented at the conference site) and the successive slides, step 708. At step 710, the network server 602 requests the image file from the distribution device 100 (or from the server on which the image file is stored), at which point the current and successive image files are transmitted to the network server, step 712. At step 714, the network server 602 stores the image file into the network server 602 cache memory, so that it is readily available for transmission to viewer terminals 114 (FIG. 6).

Step 716 depicts the step of the network server 602 (FIG. 6) requesting the stream server 106 to route the streams to the viewer web browser 224 (FIG. 2). This action occurs only if the viewer has chosen to view the conference in a streaming environment. Effectively concurrent with step 716, at step 718 the network server 602 informs the web browser that an image is available for viewing, whereby the web browser 224 is caused to execute an application (which is written in Java language in a commercial embodiment) that is referenced within the HTML document provided by the network server 602. At steps 720 and 722, the Java application requests the image data from the network server 602, and upon reception, caches the image data to the web browser 224/memory 214 (FIG. 2). This activity occurs prior to the transmission and arrival of the associated streaming audio/video content from the remote streaming server 106, step 724, so that the image data is locally available at the viewer terminal when it is required for display in coordination with the streaming audio/video content. Steps 708–724 are repeated each time that presentation content is referenced in the stream during the active video-conference.

It will be recognized by those skilled in the art that, while the invention has been described above in terms of preferred embodiments, it is not limited thereto; Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A multimedia distribution device, comprising:
a network interface, for coupling the distribution device to a network, the network interface operative to receive audio and video data from a peripheral videoconferencing device at a conference site, the audio data representative of speech and the video data representative of human behavior,
an encoder in communication with the network interface, for creating a stream of data from the audio data and the video data, the stream being encoded in a streaming technology format; and
a stream server, for transmitting the stream to at least one remote terminal connected to the network.

2. The distribution device of claim 1, further comprising a medium for storing the stream for future viewing.

3. A multimedia distribution device, comprising:
a network interface, for coupling the distribution device to a network, the network interface operative to receive audio and video data from a peripheral videoconferencing device at a conference site, the audio data representative of speech and the video data representative of human behavior;
an encoder in communication with the network interface, for creating a stream of data from the audio data and the video data, the steam being encoded in a streaming technology format;
a stream server, for transmitting the stream to at least one remote terminal connected to the network;
a data interface, for receiving presentation data from a source; and
a file conversion engine, for creating a graphic image file by converting the presentation data into a graphic image format;
wherein the stream includes the audio data and the video data and a link to the location of the graphic image.

4. The distribution device of claim 3, further comprising:
a web server, for transmitting the graphic image to the at least one remote terminal connected to the network, the graphic image representing the presentation data currently being displayed at the conference site.

5. The distribution device of claim 4, wherein the presentation data comprises a file created through utilization of a presentation, word processing, or spreadsheet application.

6. The distribution device of claim 4, wherein the web server transmits a web page, the web page including a presenter toolbar enabling the user of the at least one remote terminal to remotely transmit the presentation data to the data interface.

7. The distribution device of claim 4, further comprising a display module for displaying the audio data and the video data and the presentation data at the conference site.

8. The distribution device of claim 4, wherein the web server transmits a web page, the web page comprising:
a first window, for viewing a decoded display of the encoded video data;
a second window, for viewing the graphic image; and
a third window, including a text entry interface for the user of the at least one remote terminal to communicate with the persons located at the conference site by inserting text into the text entry interface and transmitting the text to the distribution device for display by the display module, for viewing by the persons located at the conference site.

9. The distribution device of claim 4, wherein the device is operative to utilize an external web server for transmitting the graphic image to the at least one remote terminal.

10. The distribution device of claim 9, wherein the graphic image is cached at the external web server to facilitate rapid transmission to the at least one remote terminal.

11. The distribution device of claim 10, wherein a second graphic image representing a second presentation data successive to the one currently being displayed at the conference site is cached at the external web server to facilitate rapid transmission to the at least one remote terminal.

12. The distribution device of claim 9, wherein the graphic image is cached at the at least one remote terminal to facilitate rapid display of the graphic image at the at least one remote terminal.

13. The distribution device of claim 12, wherein a second graphic image representing a second presentation data successive to the one currently being displayed at the conference site is cached at the at least one remote terminal to facilitate rapid display of the graphic image at the at least one remote terminal.

14. The distribution device of claim 3, wherein the source comprises an internal device for reading information stored on a portable data storage medium.

15. The distribution device of claim 3, wherein the source comprises an external application device coupled to the distribution device through the network interface.

16. The distribution device of claim 3, wherein the device is operative to utilize an external stream server coupled to the device through the network for transmitting the stream to at least one remote terminal connected to the network.

17. A multimedia distribution device for use with a network, a videoconferencing device at a conference site, a source providing presentation data and at least one remote terminal connected to the network, the distribution device, comprising:
- a network interface for coupling to the network;
- an audio and video interface for receiving audio and video data from the videoconferencing device, the audio data representative of speech and the video data representative of human behavior;
- an encoder coupled to the audio and video interface for encoding the audio and the video data received through the audio and video interface into a streaming technology format;
- a data interface for receiving presentation data from the source; and
- a file conversion engine coupled to the data interface for creating a graphic image file by converting the presentation data into a graphic image format and storing the graphic image file at a location; and
- a stream server coupled to the encoder, the file conversion engine, and the network interface for transmitting streaming data for receipt by at least one remote terminal connected to the network, wherein the streaming data includes the audio and video data in streaming technology format and a link to the location of the graphic image file.

18. The distribution device of claim 17, further comprising:
- a web server coupled to the file conversion engine and the network interface for transmitting the graphic image file to the network for receipt by at least one remote terminal connected to the network, the graphic image file representing the presentation data currently being displayed at the conference site.

19. The distribution device of claim 18, wherein the presentation data comprises a file created through utilization of a presentation, word processing, or spreadsheet application.

20. The distribution device of claim 18, wherein the web server is for transmitting a web page, the web page including a presenter toolbar enabling the user of the at least one remote terminal to remotely transmit the presentation data to the data interface.

21. The distribution device of claim 18, further comprising a display module for displaying the audio data, the video data and the presentation data at the conference site.

22. The distribution device of claim 18, wherein the web server is for transmitting a web page, the web page operative to cause the development of:
- a first window for viewing a decoded display of the encoded video data;
- a second window for viewing the graphic image; and
- a third window including a text entry interface for the user of the at least one remote terminal to communicate with the persons located at the conference site by inserting text into the text entry interface and transmitting the text to the distribution device for display by the display module, for viewing by the persons located at the conference site.

23. The distribution device of claim 18, wherein the device is operative to utilize an external web server for transmitting the graphic image to the at least one remote terminal.

24. The distribution device of claim 23, wherein the graphic image is cached at the external web server to facilitate rapid transmission to the at least one remote terminal.

25. The distribution device of claim 24, wherein a second graphic image representing a second presentation data successive to the one currently being displayed at the conference site is cached at the external web server to facilitate rapid transmission to the at least one remote terminal.

26. The distribution device of claim 17, wherein the presentation data source is external to the distribution device and the data interface is the network interface.

27. The distribution device of claim 17, wherein the device is operative to utilize an external steam server coupled to the device through the network for transmitting the stream to at least one remote terminal.

28. The distribution device of claim 17, further comprising a medium for storing the strewing data for future viewing.

29. A multimedia distribution device for transmitting audio, video and/or other data between a local site and remote sites via a digital electronic network, comprising:
- a network interface for communicating with other devices on the network;
- an audio and video interface for receiving audio and video data from a peripheral videoconferencing device at a local site;
- a streaming encoder coupled to the audio and video interface for creating streaming audio and video data in streaming technology format from the received audio and video data;
- a streaming server coupled to the network interface and the streaming encoder for transmitting streaming audio and video data in streaming technology format; and
- a web server coupled to the network interface for receiving and transmitting image data and text data.

30. The multimedia distribution device of claim 29, further comprising:
- a file conversion engine coupled to the web server for creating image data by converting presentation data to image data.

31. The multimedia distribution device of claim 30, wherein the presentation data comprises at least one of slide presentations, word processing documents or spreadsheets.

32. The multimedia distribution device of claim 29, further comprising:
- a storage device coupled to the streaming server for storing data including at least one of streaming audio and video data, presentation data, text data or image data.

33. The multimedia distribution device of claim 29, wherein the web server is operative to receive user input and to authenticate user identity.

34. The multimedia distribution device of claim 33, wherein the web server is operative to transmit a web page, the web page operative to cause the development of:
- a first window for displaying streaming video data and playing streaming audio data;
- a second window for displaying images; and
- a third window for displaying text data and accepting text data from a user of at least one remote terminal to communicate with the persons located at the local site.

35. The multimedia distribution device in claim 34, wherein the web server is operative to receive a command from a user to display a requested image in the second window.

36. The multimedia distribution device in claim 34, wherein the streaming video and audio data contain links to the images, and wherein an image would be displayed in the second window when the audio and video data which contain the corresponding link would be displaying in the first window.

37. A method for multimedia conferencing wherein audio, video, still image and text data are received and transmitted through a network, the method comprising:

receiving audio and video data from a local multimedia conferencing unit through an audio and video interface;

encoding audio and video data to streaming audio and video data streaming technology format;

transmitting streaming audio and video data in streaming technology format through the network;

transmitting still images through the network; and transmitting text data through the network.

38. The method for multimedia conferencing of claim 37, further comprising:

converting presentation data into still images for transmission.

39. The method for multimedia conferencing of claim 37, further comprising:

receiving text data from a user; and authenticating the user identity.

40. The method for multimedia conferencing of claim 39, further comprising:

allowing the user to manipulate the transmission of the still images and text data including uploading presentation data and selecting still images for transmission.

41. The method for multimedia conferencing of claim 37, wherein the network is the Internet; and wherein the streaming audio and video data, the still images and the text data are transmitted for displaying in three windows in a web browser.

42. The method for multimedia conferencing of claim 37, further comprising:

receiving the streaming audio and video data, the still images and text data at an intermediate server; and the intermediate server retransmitting the streaming audio and video data, the still images and text data.

43. The method for multimedia conferencing of claim 37, further comprising:

embedding a control signal in the streaming audio and video data, wherein the control signal controls the timing of when the still images are transmitted.

44. A multimedia distribution device for use with a network, a videoconferencing device at a conference site and at least one remote terminal connected to the network, the distribution device comprising:

an interface for coupling to the network and the video conferencing device to receive audio and video data from the videoconferencing device;

an encoder coupled to the interface for creating a stream of data from the received audio and video data; and a stream server coupled to the encoder and the interface for transmitting the stream of data over the network for receipt by the remote terminal.

45. The distribution device of claim 44, wherein the interface includes a network interface for coupling to the network and an audio and video interface for coupling to the videoconferencing device.

46. A multimedia distribution device for use with a network, videoconferencing device at a conference site and at least one remote terminal connected to the network, the distribution device further for use with a source providing presentation data, wherein the interface is further for coupling to the presentation data source to receive presentation data, the distribution device comprising:

an interface for coupling to the network and the video conferencing device to receive audio and video data from the videoconferencing device;

an encoder coupled to the interface for creating a stream of data from the received audio and video data;

a stream server coupled to the encoder and the interface for transmitting the stream of data over the network for receipt by the remote terminal;

a file conversion engine coupled to the interface for creating and storing a graphic image file by converting the received presentation data into a graphic image format, and wherein the stream server is coupled to the file conversion engine and includes a link to the location of the graphic image file in the stream.

47. The distribution device of claim 46, further comprising:

a web server coupled to the interface and the file conversion engine for transmitting the graphic image file to the network for receipt by at least one remote terminal, the graphic image file representing the presentation data currently being displayed at the conference site.

48. The distribution device of claim 47, wherein the presentation data comprises a file created through utilization of a presentation, word processing, or spreadsheet application.

49. The distribution device of claim 47, wherein the web server is for transmitting a web page, the web page including a presenter toolbar enabling the user of the at least one remote terminal to remotely transmit the presentation data to the data interface.

50. The distribution device of claim 47, comprising a display module for displaying the audio data, the video data and the presentation data at the conference site.

51. The distribution device of claim 47, wherein the web server is for transmitting a web page, the web page operative to cause the development of:

a first window for viewing a decoded display of the encoded video data;

a second window for viewing the graphic image; and a third window including a text entry interface for the user of the at least one remote terminal to communicate with the persons located at the conference site by inserting text into the text entry interface and transmitting the text to the distribution device for display by the display module, for viewing by the persons located at the conference site.

52. The distribution device of claim 47, wherein the device is operative to utilize an external web server for transmitting the graphic image to the at least one remote terminal.

53. The distribution device of claim 52, wherein the graphic image is cached at the external web server to facilitate rapid transmission to the at least one remote terminal.

54. The distribution device of claim 53, wherein a second graphic image representing a second presentation data successive to the one currently being displayed at the conference site is cached at the external web server to facilitate rapid transmission to the at least one remote terminal.

55. The distribution device of claim 46, wherein the presentation data source is external to the distribution device.

56. The distribution device of claim 46, wherein the device is operative to utilize an external stream server coupled to the device through the network for transmitting the stream to at least one remote terminal.

57. The distribution device of claim 46, further comprising a medium for storing the streaming data for future viewing.

* * * * *

UNITED STATES PATENT AND TRADEMARK OFFICE
CERTIFICATE OF CORRECTION

| | | |
|---|---|---|
| PATENT NO. | : 6,760,749 B1 | Page 1 of 1 |
| APPLICATION NO. | : 09/568642 | |
| DATED | : July 6, 2004 | |
| INVENTOR(S) | : Wayne Dunlap et al. | |

It is certified that error appears in the above-identified patent and that said Letters Patent is hereby corrected as shown below:

In claim 1 Col. 11, line 7:
    A semicolon --;-- should replace the comma "," after the words "human behavior".

In claim 28 Col. 14, line 2:
    The word "strewing" should be replaced with --streaming--.

In claim 46 Col. 15, line 2:
    The word --a-- should be inserted before "videoconferencing device".

In claim 50 Col. 16, line 1:
    The word --further-- should be inserted before "comprising a display".

Signed and Sealed this

Eighth Day of January, 2008

JON W. DUDAS
*Director of the United States Patent and Trademark Office*